United States Patent Office 3,329,660
Patented July 4, 1967

3,329,660
SHAPED ARTICLES
Leonard S. Pitts, Afton, Va., assignor to E. I. du Pont de Nemours and Company, Wilmington, Del., a corporation of Delaware
No Drawing. Filed Nov. 27, 1964, Ser. No. 414,462
3 Claims. (Cl. 260—79.3)

This application is a continuation in part of application Ser. No. 259,445, filed Feb. 18, 1963, now abandoned.

This invention relates to the preparation of new high polymers and to shaped articles prepared therefrom. More particularly, the invention relates to the production of polymeric sulfones which provide textile filaments and films which are substantially color-free and have improved physical properties.

The preparation of polydiene sulfur dioxide polymers is known as is the preparation of shaped articles therefrom. However, such polymers have generally provided filaments and films of inferior physical properties. For example, filaments prepared from the homopolymers have exhibited the extremes of being rubbery or brittle, with the development of dark color and instability upon exposure to heat and ultraviolet light and ageing being evidenced by the non-rubbery structures. Substitution of various groups, e.g., halogens and hydrocarbon groups, on the polymer chain has failed to provide filaments which are useful in the usual textile applications.

It is, therefore, an object of the present invention to provide polymeric sulfones which have improved physical properties. It is a more specific object of this invention to provide polysulfone filaments and films which are substantially color-free and have outstanding heat- and light-stability. It is a further object of this invention to provide multi-component filaments from the novel polysulfones. These and other objects will become apparent from the following detailed description.

The objects of this invention are accomplished by providing high molecular weight polybutadienesulfones having a combined sulfur content of at least about 27 grams of sulfur, present as sulfone, per gram equivalent weight of polymerized butadiene. As presently understood, these novel polymers are substantially linear polymers comprised of repeating units having the structural formula:

Accordingly, the cyclic structure in the units may be refered to as cyclic 2,5-tetramethylene sulfone units. These polymers may be prepared as films and filaments which are substantially color-free, i.e., essentially white.

In preparing the polymers and shaped articles of this invention, the general procedure described in U.S. 2,469,847, in which a solution of a butadiene polymer to which a hydroperoxide catalyst has been added is extruded into a reaction medium containing sulfur dioxide, may be followed. It is essential, however, that the butadiene polymer be selected in accordance with this invention in that at least 85% must be 1,4-addition units, i.e., having the structure —CH$_2$CH=CHCH$_2$—. The 1,4-addition may be either in the cis- or trans-form, i.e., having the respective structures

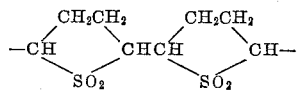 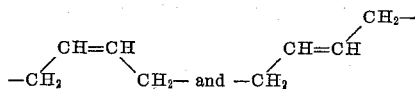

or a mixture of both forms. The remaining units may be of the 1,2-vinyl type having the structure

—CH$_2$—CHCH=CH$_2$

A butadiene polymer in which at least 37% of the 1,4-addition units are of the cis-form is preferred. Reaction conditions must be controlled to provide a final polymer having a combined sulfur content of at least about 27 grams of sulfur, present as sulfone, per gram equivalent weight of polymerized butadiene. Preferably, a butadiene additon polymer is selected and reaction conditions controlled to provide from about 28 to 32 grams of combined sulfur, as sulfone, per gram equivalent weight of polymerized butadiene. Accordingly, the final product consists essentially of one sulfone unit per polymerized butadiene unit.

The polymers of this invention find their greatest utility in textile filament applications. Both wet- and dry-spinning techiques may be used in preparing the filaments which have unique physical properties. Among the preferred embodiments of this invention are the filaments which exhibit essentially no shrinkage, i.e., with less than 1% shrinkage occurring upon heat relaxation after being drawn from 1.5 to 2.5 times their original length. They are substantially free of coloration and substantially retain their color-free characteristic upon ageing and exposure to heat and ultraviolet light.

Among the products of this invention which are particularly desirable are composite filaments prepared from two or more polybutadienesulfones within the foregoing definition. These composite filaments, in which two or more polymer components are eccentrically disposed toward each other in distinct zones with adjoining surfaces in intimate, adhering contact with each other, exhibit unique crimping forces with very small dimension changes. The composite filaments of this invention exhibit reversible, spiral crimp with exceptionally high crimping forces.

The crimping forces may be provided by varying the relative amounts of 1,4-addition units in the polybutadiene used in preparing the components. Upon varying these units by as little as about 1% some crimping is noted. It is believed that this minor change in the 1,4-addition unit content provides final polybutadienesulfone components, upon reaction of the polybutadiene with sulfur dioxide, which have a significant difference in hydrophilicity, thereby giving a resultant composite structure having crimping characteristics. The composite filaments exhibit a crimp reversibility which is similar to that defined in U.S. 3,038,237. This crimping can be amplified by increasing the differential 1,4-addition unit content of the components as well as by merely treating the composite structures with a hydrolytic agent such as a caustic material, e.g., trisodium phosphate or sodium carbonate. It is believed that the crimping may be due ultimately to a differential amount of ionizable sulfur acids, e.g., sulfonic and sulfinic acids, which are formed on the polymer chain during the sulfonylation reaction or during the treatment with the caustic material. A differential between the components of as little as 50 milliequivalents per kilogram of polymer of ionizable groups is generally sufficient to provide crimping in the composite filaments.

The crimped composite filaments of this invention exhibit a high "squirm work value," which is a measure of the ability of the fiber to do external work on wet to dry cycling and will be described in more detail later herein. This work includes both the work done by crimping and by longitudinal swelling and deswelling. More importantly, a high value is obtained for that work which results only via the crimping mechanism, which will be designated "squirm crimp work." Squirm crimp work often exceeds "squirm work," indicating that all of the crimp is not removed from the filament during the wet cycle. This property has not previously been obtained with synthetic filaments but is a characteristic of wool. In view of the inherent low shrinkage of the polybutadienesulfone filaments of the present invention, the composite filaments provide bulk and covering power without the necessity of using high and low shrinkage components and, at the same time, provide crimping forces which lead to improved resiliency in fabrics prepared therefrom.

The composite filaments of this invention may be prepared using substantially equal amounts of each of the polybutadienesulfone components with the cross-sectional shape of the filaments and the components being varied to provide various tactile and optical properties. The particular proportions of the components are not critical and may be varied within wide ranges, e.g., as low as 10% by weight of one component may be used to permit the properties of the other component to be dominant in the composite structure.

Spinning of the filaments of this invention, i.e., both single component and composite filaments, is, as previously mentioned, accomplished by extruding solutions of butadiene polymers containing a catalyst into a reaction medium containing sulfur dioxide. Conventional dry-spinning apparatus may be used in spinning single component or homofilaments, and the apparatus disclosed in Calhoun U.S. Patent 3,006,028 may be used in spinning the multi-component or composite filaments. Films may be prepared by extruding or casting the polybutadiene catalyst-containing solution onto a smooth surface, followed by immersion of the extruded solution in a reaction bath containing sulfur dioxide.

In preparing solutions for extrusion, the butadiene polymers may be dissolved in a wide variety of organic solvents. The solvents must, of course, be inert to the ingredients in the reaction medium into which the polymer solution is extruded. The solvents include aromatic, aliphatic, and cycloaliphatic solvents such as benzene, toluene, hexane, heptane, cyclohexane, methylcyclohexane, and mixtures of the aforementioned compounds, as well as halogenated hydrocarbons such as dichlorodifluoromethane and cyclic ethers. A preferred solvent is tetrahydrofuran. A sufficient amount of the solvent is used to give the desired solid content in the spinning solution. Generally, the solutions to be extruded should contain sufficient solids to provide a Brookfield viscosity at the spinning temperature of from about 0.5 to about 500 poises. Preferably, the solids content is sufficient to provide a viscosity in the range of 2 to 100 poises at a spining temperature from about 0° C. to about 80° C.

In preparing the spinning solutions, the catalyst may be selected from any of a number of the well-known hydroperoxides. In addition, certain peroxides are also satisfactory. It is essential that the catalyst be used in an mount sufficient to ensure reaction of the sulfur dioxide with the butadiene polymer to provide at least 27 grams of sulfur per gram equivalent weight of polymerized butadiene in the polymer chain. Tertiary butyl hpdroperoxide is one preferred catalyst. Other catalysts suitable for use in this invention may be represented by the formula

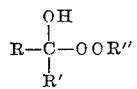

in which R and R′ are alkyl, aryl or alkaryl groups, and R″ is hydrogen, alkyl, aryl or alkaryl. Thus, hydroperoxides and hydroxy peroxides in which the hydroxy group is alpha to the peroxide group are among the suitable catalysts. These catalysts include cumene hydroperoxide, cyclohexanone peroxide (a mixture of hydroxy peroxides and hydroxy hydroperoxides), diisopropyl benzene hydroperoxides, hydroxyheptyl peroxide, paramenthane hydroperoxide, dimethyl hexane dihydroperoxide, and tertiary butyl hydroperoxide. Generally, from about 0.5% to about 2.0% of the catalyst, based on the weight of the polymer solution, will be required. The minimum amount of catalyst which will provide sufficient reactivity to yield the requisite sulfur content should be used for reasons of economy; however, excess catalyst will not damage the filaments due to the high level of reaction which is obtained and the high degree of chemical inertness of the products prepared by the process of this invention.

The aforementioned solutions are extruded into a reaction medium containing sulfur dioxide. Preferably, the sulfur dioxide is dissolved in a coagulating bath, the composition of which may be varied within wide limits. The bath preferably contains a poor solvent for the butadiene polymer, or a mixture of one or more solvents for the polymer with one or more non-solvents. Suitable coagulating baths may contain 100% ethyl or other alcohol, a cyclic ether-alcohol mixture, or a mixture of up to 90% of benzene with 10% or more of a lower alkyl alcohol containing from 1 to 4 carbon atoms. All of these mixtures may contain water in addition to the other two components. In general the amount of water tolerable is limited by the mutual solubility of the three components. The water content should be kept below 10% so that a homogeneous spin bath results. It has been found that, in a benzene-alcohol coagulating bath, as the alcohol content approaches the 75% level, the filament cross sections tend to become slightly oval and, as the alcohol content is further increased, a kidney-shaped or dogbone cross-sectional configuration results.

It has been observed that the toughness of the filaments, as measured by the work-to-break or by the flex life, is appreciably improved if spinning is carried out with the minimum tension on the thread line as the filamets leave the spinneret. The drawing at this point, referred to as the spindraw, should be less than 1 and preferably less than 0.8. It is believed that any appreciable drawing at this stage causes breaks in the surface of the fibers which are responsible for the decrease in flex life.

In order to provide more stable filaments, especially non-round, cross-sectional shape filaments, the as-spun filaments may be treated first with an oxidizing agent such as aqueous potassium permanganate in a concentration from about 0.2% to about 0.5%, and then passed through a bath containing, for example, sulfur dioxide, to remove the potassium permanganate residues, followed by an alkaline bath.

Both round and non-round filaments must, in all cases, be treated in an alkaline bath upon being removed from the coagulating bath. The filaments may be treated in the alkaline bath in either the drawn or undrawn state. Drawing, e.g., from about 1.5× to about 3.5×, may be accomplished in an aqueous bath at a temperature extending from room temperature to about 100° C. or in an alcohol bath at room temperature. In preparing the alkaline bath, various inorganic as well as organic alkaline materials which are soluble in the bath and are non-solvents for the polybutadienesulfones may be used. For example, sodium bicarbonate, sodium carbonate, trisodium phosphate, sodium hydroxide, as well as quaternary amines such as tetramethyl ammonium hydroxide may be used.

Preferably, sodium bicarbonate is used in an aqueous bath which is maintained at a temperature in the range from about 80° to about 100° C. Concentrations of from about 1% to about 10% by weight of the sodium bicarbonate are preferred. The filaments may be passed through the bath in a continuous manner with a residence time of only a few seconds. The residence time should be sufficient to permit neutralization of any acids, e.g., sulfur acids, which may be present. Upon removing the filaments from the bath, they are washed with water to remove any residual alkaline material, dried, and collected to form a desired package.

As previously mentioned, selection of the butadiene polymer is critical in providing the filaments of the present invention. Butadiene polymers having the requisite percentage of 1,4-addition repeating units, i.e., at least 85%, may be prepared in accordance with the teaching in Australian patent application 22,440/1956. The preparation of such polymers is also described by C. Longiave, R. Castelle, and F. G. Grace in an article entitled "New Stereospecific Catalysts for the Polymerization of Butadiene," Chemica e Industria, 43, No. 6, pp. 625–630 (1961).

The molecular weight and relative viscosity of the butadiene polymers which may be used is not critical. It is only necessary that the solutions be sufficiently viscous to permit extrusion into filamentary form. In general, butadiene polymers having molecular weights above about 5000 are suitable for preparing filamentary products.

For the purposes of this invention, "inherent viscosity" is defined as $ln\eta/rC$, where $\eta r$ is the viscosity of a dilute solution of the polymer in a solvent mixture (benzene) divided by the viscosity of the solvent in the same units and at the same temperature and C is the concentration in grams of the polymer per 100 cc. of solution.

"Color value" $b$ may be determined from colorimetric data obtained by analyzing continuous filament and fabric samples which are about three inches square. The reflectance ratio of the samples in the blue filter setting of a colorimeter is measured, using a Model IV Color Master Differential Colorimeter, manufactured by Manufacturing Engineering and Equipment Company, Hatboro, Pennsylvania, and calibrated against the manufacturer's standard reference plates and the National Bureau of Standard's certified reflectance plates. Three readings are taken on each of the samples, one of the measurements for the filament sample being made with sample rotated 90° from the position of the first reading. The $b$ values are then calculated from the average of three readings. In the following examples, the $b$ values are estimated values.

In the following examples, the determination of sulfur content was accomplished using the Parr bomb method which is a known gravimetric test for determining sulfur content.

"Squirm work" and "squirm crimp work," which measure the work performed by the composite filaments when changing their environment from a hot-wet to a dry condition, were determined by the following formulas:

Squirm Work (SW)
$$=\frac{(L_1\ av.-L_2\ av.)(W)}{L_1\ av.}\times 10^{-3}\ gm.\ cm./cm.$$

Squirm Crimp Work (SCW)
$$=\frac{(L_3\ av.-L_2\ av.)(W)}{L_3\ av.}\times 10^{-3}\ gm.\ cm./cm.$$

In the foregoing formulas:

$W$=average weight in milligrams per filament sample.
$L_1$ av.=average length of all filaments in centimeters in the hot-wet condition.
$L_2$ av.=average length of all filaments in centimeters in the hot-dry condition.
$L_3$ av.=average length of all filaments in centimeters after one hot-wet to hot-dry cycle when weighted with a 150-milligram weight at room temperature (ca. 25° C.).

In the examples, the procedure for determining squirm work and squirm crimp work was as follows:

A sample containing a number of filaments cut to a predetermined length was treated, i.e., boiled off, in a water bath containing deionized water at a temperature of 90°±1° C. for fifteen minutes. Eight filaments were selected from the sample. A 2-milligram weight was attached to one end of each of the filaments. The eight filaments with the attached weights were simultaneously weighed on an analytical balance (to the nearest 0.1 mg.). The total weight was recorded, then divided by the number of filaments (8) to obtain the average weight W per filament. Each of the filaments was suspended from a support using a spring clamp, and then suspended in the deionized water bath by moving the support up and down until the weighted filaments were entirely immersed in the bath. At the end of five minutes, the length of each filament, from the clamp to the weight, was read (to the nearest 0.01 cm.) and recorded as $L_1$. The $L_1$ average was determined by dividing the total of the lengths by 8. The filaments were then removed from the water and suspended in an oven heated to a temperature between 90° C. and 93° C. for fifteen minutes. The length of each filament from the clamp to the weight was read (to the nearest 0.01 cm.) and recorded as $L_2$. The filaments were then removed from the oven and a 150-milligram weight attached to each filament. The length of each filament was read and recorded as $L_3$. The $L_3$ and $L_2$ averages were also determined by dividing the appropriate total of the lengths by 8.

Analysis of the polybutadiene to determine the percentage of 1,4-addition units was accomplished by conventional procedures using infrared analysis.

The Xenometer referred to in the examples was comprised of xenon lamp mounted in an Atlas Weather-O-Meter of the type illustrated at pages 8–A. Technical Manual of the American Association of Textile Chemists and Colorists for 1961, which is manufactured by the Atlas Electrical Devices Company. The xenon lamp supplied therewith was a 600-watt, 220-volt lamp sold under the trade name "Osram." The filament samples were mounted within the frame at a distance of 15½ inches from the lamp center and were rotated about the lamp at one revolution per minute. The air in the area of the sample was at a dry bulb temperature of 37° C. and a wet bulb temperature of 23° C., indicating a relative humidity of 32%.

The following examples, which include specific embodiments of the present invention, further illustrate the invention. Throughout the examples, parts and percentages are by weight unless otherwise specified.

*Example I*

A polybutadiene, having an inherent viscosity of 1.9, consisting of 93.6% cis-1,4-, 3.6% trans-1,4-, and 2.8% 1,2-addition units, was dissolved in benzene to provide a 10% solution of the polymer. To the solution 2% of tertiary butyl hydroperoxide, based on the weight of the solution, was added. The hydroperoxide-containing solution was then extruded through a spinneret, at a rate of 10 yards per minute, into a bath containing 1000 parts of ethyl alcohol, 500 parts of benzene, and 500 parts of sulfur dioxide at a temperature of 25° C., and withdrawn from the bath at the rate of 15 yards per minute. The filaments were drawn 2× while passing them through an ethyl alcohol bath at a temperature of 25° C. and withdrawing them at a speed of 30 yards per minute. The filaments were washed in boiling water and subsequently passed through a bath containing 5% by weight of sodium bicarbonate at a temperature of 25° C. and then wound onto a spool. After drying, the filaments, which had a denier of 3, were analyzed and found to possess the following properties:

Tenacity _____grams per denier__ 1.3
Modulus _____do____ 40
Elongation _____percent__ 20
Tensile recovery from 3% elongation _____do____ 60
Initial color value $b$ _____ 1
Discoloration after three hours at 165° C.
 _____Very slight__ ($b\approx 5$)
Hours to color break in Xenometer _____ 200
Sulfur (gm./gm. equivalent weight of polymerized butadiene) _____ 29.4

A plain-weave Oxford fabric, weighing 5.52 ounces per square yard and having density of 0.78 gram per cubic centimeter, was constructed from the filaments, using 2½ inch staple in the yarn. The fabric was found to have a crisp hand, to be highly resilient, and to have good resistance to wrinkling.

The fold work recovery, determined by folding four-inch by eight-inch samples of fabric across the filling threads in one direction and across the warp threads in the other direction, and compressing each fold on an Instron tester with an Integrator, was found to be 66.4%.

Shirts made from the fabric were easily laundered and required little ironing due to their wrinkle resistance.

*Example II*

The procedure of Example I was repeated except that the treatment of the filaments in the sodium bicarbonate bath was omitted. Upon examination, the filaments were found to discolor to a dark brown color when exposed for thirty minutes at a temperature of 165° C. ($b \approx 12$). A definite color break was observed in less than one hour when the filaments were exposed in a Xenometer.

*Example III*

This example illustrates the preparation of filaments from a polybutadiene in which the percentage of 1,4-addition units is outside the limits necessary to provide the filaments of the present invention.

A polybutadiene was prepared by a standard emulsion polymerization technique. The polybutadiene, which had an inherent viscosity of 1.7, contained 40% cis-1,4-, 40% trans-1,4-, and 20% 1,2-addition units. The procedure outlined in Example I was repeated except that the solution contained 13.5% of the polybutadiene.

Upon examination, the filaments were found to have a modulus of 27 grams per denier and a sulfur content of 26 grams of sulfur per gram equivalent weight of polymerized butadiene. The filaments turned brown after one hour's heating at 165° C. ($b \approx 20$–$30$), and developed color after one hour exposure in Xenometer. The physical properties after exposure in the Xenometer were so poor as to render the filaments totally unfit for textile use.

*Example IV*

This example further illustrates the unsatisfactory results obtained when a polybutadiene outside the scope of the present invention is utilized in preparing filaments.

A polybutadiene, having a molecular weight of 100,000, was prepared by known methods, using a butyllithium catalyst. By infrared analysis it was determined that the polymer contained 95% 1,2- and 5% trans-1,4-addition units. The procedure outlined in Example I was repeated except that a 20% solution of the polymer was prepared. The filaments which were collected could not be drawn more than 1.1×.

Upon examination, the filaments were found to have a tenacity of 0.64 gram per denier, a modulus of 22 grams per denier, and a sulfur content of 18.1 grams of sulfur per gram equivalent weight of polymerized butadiene. The filaments discolored badly on heating and exposure in the Xenometer ($b \approx 35$).

*Example V*

Two groups of filaments were prepared following the procedure outlined in Example I except for variations noted in the tables which follow. In preparing the first group of filaments, a polybutadiene having a 98% cis-1,4-, 1% trans-1,4-, and 1% 1,2-addition structure prepared using a cobalt/Al(Et)$_2$Cl catalyst as described in Italian Patent 592,477, was used. The second group of filaments was prepared using a polybutadiene having 95% cis-1,4-, 2% trans-1,4-, and 3% 1,2-addition units, using a triethyl aluminum and titanium tetra-iodide catalyst. The data for the respective groups are set forth in Tables 1 and 2 which follows:

TABLE 1

| Exp. | Percent Solids | Percent Cat. | Draw Ratio | Max. Possible Draw Ratio | T/M/E [1] | S [2] |
|---|---|---|---|---|---|---|
| 1 | 8 | 1.0 | 2X | 3.5X | 1.9/50/18 | 30.5 |
| 2 | 8 | 2.0 | 2X | 3.5X | 1.7/45/25 | 29.1 |
| 3 | 8 | 0.5 | 2X | 3.5X | 1.6/46/11 | 29.2 |
| 4 | 15 | 1.0 | 2X | 3.5X | 1.8/50/14 | 29.7 |
| 5 | 18 | 1.0 | 2X | 3.5X | 1.7/54/12 | 29.7 |
| 6 | 10 | 2.0 | 2X | 3.5X | 1.8/50/14 | 30.1 |

[1,2] See footnotes at end of Table 2.

TABLE 2

| Exp. | Percent Solids | Percent Cat. | Draw Ratio | Max. Possible Draw Ratio | T/M/E [1] | S [2] |
|---|---|---|---|---|---|---|
| 7 | 10 | 2.0 | 1.5X | 2.1X | 1.2/35/17 | 29.4 |
| 8 | 4 | 1.0 | 1.5X | 2.1X | 1.1/33/31 | 29.4 |
| 9 | 5 | 0.25 | 1.5X | 2.1X | 1.1/36/24 | 28.9 |
| 10 | 15 | 0.8 | 1.5X | 2.1X | 1.3/41/13 | 29.2 |
| 11 | 8 | 2.0 | 1.5X | 2.1X | 1.2/42/14 | 29.5 |

[1] T = Tenacity in grams per denier; M = Initial modulus in grams per denier; E = Elongation as percent.
[2] S = Sulfur in grams per gram equivalent weight of polymerized butadiene.

From the data set forth in the tables, it is indicated that higher values for tenacity, modulus, and sulfur content are obtained when using the polybutadiene having 98% cis-1,4-addition. While the tenacity and modulus of the two groups of filaments are undoubtedly influenced by the difference in draw ratio, all of the filaments were drawn amounts approaching their practical drawability limits. Greater draw-ability was possible with the higher cis-1,4- and higher sulfur content filaments.

*Example VI*

This example illustrates preparation of filaments by a dry spinning technique.

A 16% solution of a polybutadiene containing 95% cis-1,4-units and having an inherent viscosity of 1.99 was prepared by dissolving the polymer in benzene. To the solution 1% tertiary butyl hydroperoxide was added as a catalyst. The solution was spun through a 0.004 inch single-hole spinneret into an atmosphere of 100% sulfur dioxide contained in a four-foot vertical spinning cell having a diameter of three inches. The bottom of the cell was closed by a water seal to confine the sulfur dioxide to the cell and permit removal of the filament. The solution was extruded at a linear speed of 100 yards per minute. After leaving the spinning cell, the filament was passed around a drive roll rotating at a surface speed of 50 yards per minute. Under these conditions, the filament was maintained in a taut condition. The filament was then drawn 1.5× in an aqueous bath at 95° C. and passed through a bath containing 5% sodium bicarbonate at 25° C. Upon examination, it was found that the filament contained 29.2 grams of sulfur per gram equivalent weight of polymerized butadiene and had the following properties: tenacity 1.38 grams per denier; modulus 38 grams per denier; and elongation of 5%. The filament exhibited good thermal and ultraviolet light stability.

*Example VII*

A solution containing 18.2% of polybutadiene having 95% 1,4-addition units and 5% 1,2-addition units, and an inherent viscosity of 1.99, was prepared in benzene. To the solution was added 3.5% tertiary butyl hydroperoxide. The solution was extruded through a 20-hole spinneret having 3-mil holes at a velocity of 20 yards per minute into a coagulating bath containing a 50/50 mixture of ethyl alcohol and benzene saturated with sulfur dioxide. The filaments were collected and drawn 2× in boiling water between two sets of rolls rotated at surface speeds of 4 and 8 yards per minute, respectively, and were then passed through an aqueous bath containing 5% sodium bicarbonate at a temperature of 25° C.

The filaments had a uniform, round cross section and showed no appreciable discoloration when heated at a temperature of 165° C. for one hour ($b \approx 5$) and exposed to ultraviolet light for eighty hours in a Xenometer.

*Example VIII*

A polybutadiene having an inherent viscosity of 1.93 which contained 37% cis-1,4-, 54% trans-1,4-, and 9% 1,2-addition units was prepared using a butyllithium catalyst. The polymer was dissolved in benzene, and cyclohexanone peroxide was added as a catalyst to provide spinning solutions having the concentrations as set forth in Table 3 which follows. The solutions were spun into a coagulating bath containing two parts of ethyl alcohol, one part of benzene, and one part of sulfur dioxide. After coagulation, the filaments were passed through boiling water and drawn to the extent shown in Table 3. Following drawing, the filaments were passed through an aqueous bath containing 0.5% potassium permanganate at 95° C. and were subsequently passed through an aqueous bath saturated with sulfur dioxide at a temperature of 25° C. Finally, the filaments were passed through an aqueous bath containing 2% sodium bicarbonate at a temperature of 25° C. The properties found upon examination of the filaments are set forth in the following table:

TABLE 3

| Exp. | Percent Solids | Percent Cat. | Draw Ratio | Max. Possible Draw Ratio | T/M/E [1] | S [2] |
|---|---|---|---|---|---|---|
| 1 | 8 | 1 | 2.2X | 3.2X | 1.46/38/22 | 29.1 |
| 2 | 8 | 2 | 2.0X | 3.2X | 1.19/35/22 | 28.9 |
| 3 | 10 | 2 | 2.0X | 3.2X | 1.60/52/19 | 29.6 |

While the filaments obtained exhibit satisfactory stability to heat and light, the physical properties were not as outstanding as filaments spun from the polybutadienes having a higher percentage of 1,4-addition units.

*Example IX*

This example illustrates the use of additives in the spinning bath to modify physical properties. To a solution (in benzene) of 10% polybutadiene having an inherent viscosity of 1.45 and containing 98% cis-1,4-addition units was added 0.2% of tertiary butyl hydroperoxide. The procedure outlined in Example I was followed except that mercaptoethanol was added to the spinning bath in amounts set forth in Table 4 which follows. Upon examination, it was found that the filaments had the following properties:

TABLE 4

| Exp. | Percent Mercaptoethanol in bath | T/M/E | S |
|---|---|---|---|
| 1 | None | 1.60/47/17 | 27.3 |
| 2 | 0.05 | 1.75/55/14 | 27.6 |
| 3 | 0.50 | 1.66/62/17 | 27.4 |
| 4 | 1.00 | 1.78/65/15 | 27.3 |

As shown in the table, the mercaptoethanol had the effect of gradually increasing the modulus of the filaments to a high value. The filaments were stable to exposure to heat and ultraviolet light.

*Example X*

The experiment described in Example I was repeated except that the concentration of ethyl alcohol and benzene in the spinning bath was varied as set forth in the following table. The properties of the filaments and the cross-sectional structure were as follows:

TABLE 5

| Exp. | Alcohol/Benzene | T/M/E | Cross Section |
|---|---|---|---|
| 1 | 50/50 | 1.27/46/11 | Round. |
| 2 | 60/40 | 1.43/43/16 | Oval. |
| 3 | 70/30 | 1.35/46/14 | Do. |
| 4 | 80/20 | 1.40/46/16 | Dogbone. |

Upon exposure to heat and ultraviolet light, it was found that the filaments having round cross section exhibited a higher resistance to heat and ultraviolet discoloration than the filaments having the dogbone cross-sectional shape. The non-round cross sections were found to exhibit a skin-core appearance when dyed with basic dyes, with the core dyeing preferentially.

*Example XI*

A 10% solution was prepared of polybutadiene (inherent viscosity 1.99) in benzene with 2% of tertiary butyl hydroperoxide. The polybutadiene contained 95% of the cis-1,4-polymer. This solution was extruded through a multi-hole spinneret at the rate of 15 yards per minute into a bath made up of 25% benzene, 50% alcohol, and 25% sulfur dioxide. The yarn was wound up at a speed to give a spinning draw of 1.5×. The yarn then passed through two cold alcohol baths (25° C.) where it was drawn 1.5×. It then passed into a boiling water bath and then through two 3% sodium bicarbonate baths. The sodium bicarbonate was then rinsed away in a boiling water bath and the yarn wound up.

The resulting yarn was free of color and developed no appreciable color after eighty hours' exposure to ultraviolet light in the Xenometer.

*Example XII*

An 8% solution of a polybutadiene containing 98% cis-1,4- and 2% trans-1,4-addition units was prepared in benzene and catalyzed with 2% of 90% tertiary butyl hydroperoxide. This solution was extruded through a spinneret into a bath containing equal parts of benzene and isopropyl alcohol. The bath was at room temperature and was saturated with sulfur dioxide. The filaments formed in the bath were withdrawn by passing them over a driven roll at a speed of 40 yards per minute, after which they were passed into an ethyl alcohol bath at room temperature. They were then removed from the alcohol bath and immediately passed into a boiling aqueous bath containing 5% sodium carbonate. They were then withdrawn from the boiling bath and passed into three consecutive boiling water baths to remove the sodium carbonate, after which they were wound onto a package. The filaments were then drawn 1.8× in boiling water by withdrawing them from the package at a speed of 36 yards per minute and using a draw roll speed of 63 yards per minute. The resulting filaments were found to have the following physical properties:

Tenacity _____ grams per denier__ 2.04
Modulus _____ do____ 68.7
Elongation _____ percent__ 5
Loop tenacity _____ grams per denier__ 1.85
Loop elongation _____ percent__ 3.9
90° C. wet tenacity _____ grams per denier__ 1.17
90° C. wet modulus _____ do____ 24.3
90° C. wet elongation _____ percent__ 12.5
Tensile recovery (from 3% elongation) ___do____ 79
Work recovery (from 3% elongation) ____do____ 45
Stress decay (from 3% elongation) _____do____ 17

*Example XIII*

A 10% solution of polybutadiene (98% cis-1,4-, 1% trans-1,4- and 1% 1,2-addition units) in benzene, containing 0.1% tertiary butyl hydroperoxide (by weight of solution) was poured into a flat tray and exposed to gaseous sulfur dioxide at atmospheric pressure for three hours. The solvent was then removed by air drying at room temperature. The product was a flexible, hard, transparent, curled sheet which was flattened by pressing in an oven at 150° C. Microtensile bars were cut from the sheet which was 32 mils thick. The following data were obtained from tensile tests run at 0.02 inch per minute:

Yield point _____p.s.i__ 9040
Ultimate elongation _____percent__ 69
Tensile modulus _____p.s.i__ 172,600

*Example XIV*

A solution of 50 grams of the polybutadiene of Example XIII and 0.5% tertiary butyl hydroperoxide in 750 cc. benzene was prepared. A small piece of 50-pound "Duostress" paper (an extensible kraft paper manufactured by the St. Regis Paper Company) was dipped in the solution, allowed to drip briefly, and then immersed in a bath of 1:1 benzene-ethanol containing 25 grams of sulfur dioxide. After fifteen minutes, the sample was removed and allowed to air day. The treated paper was more resilient and glassy than an untreated control. Tensile tests, run at 0.02 inch per minute on die cut samples, gave the following results:

| Sample | Tensile Strength, p.s.i. | Elongation, Percent |
| --- | --- | --- |
| "Duostress" Control | 2,865 | 12 |
| "Duostress" plus polysulfone | 3,580 | 17 |

*Example XV*

A solution of 10% of the polybutadiene of Example XIII in benzene containing 0.25% tertiary butyl hydroperoxide was prepared. This was used to coat the interiors of bottles and cans and also to impregnate cloth, paper and wood. Copper wire was coated by dipping in the solution. In every case, immediately after the coating had been applied and while it was still wet, the sample was immersed in a solution of at least 25 grams sulfur dioxide in 1:1 benzene-ethanol. This caused immediate hardening and insolubilization of the polymer. The benzene was then evaporated by air drying. Hard, coherent, flexible coatings of the polysulfone were obtained by this procedure.

*Example XVI*

A solution of polybutadiene containing 98% cis-1,4- and 2% trans-1,4-addition units was prepared in benzene to give a concentration of 5% solids. This solution was catalyzed with 0.5% tertiary butyl hydroperoxide based on the total weight of the solution. A film was cast from this solution onto a glass plate using a 5.0 mil doctor knife. Immediately after casting, the plate containing the film was immersed in an atmosphere of sulfur dioxide at room temperature and allowed to react for one minute. The plate was then removed from the sulfur dioxide atmosphere and the film thus formed was stripped from the plate. The firm was then washed in 1% sodium bicarbonate at 80° C. for one hour followed by three fifteen-minute boil-offs in water. The dried film could be drawn 2.5× in cold water. The film was clear, tough and transparent. Infrared spectra of this film showed it to have no detectable residual carbon-to-carbon unsaturation.

*Example XVII*

The following example illustrates the ability of the fibers of this invention to change dimensions and reach a state of equilibrium with changes in relative humidity. A 3-denier polybutadienesulfone filament (designated Sample 1) was prepared according to the procedure outlined in Example I using a polybutadiene consisting of 95% cis-1,4-, 3% trans-1,4-, and 2% 1,2-addition units. Three-denier filaments were also prepared by the process of Example I by reacting 50/50 butadiene/acrylonitrile polymer with sulfur dioxide (designated Sample 2). Polyacrylonitrile filaments of the same denier containing (1) 100% polymerized acrylonitrile, (2) 97% acrylonitrile and 3% methyl acrylate, and (3) 93.63% acrylonitrile, 6.00% methyl acrylate, and 0.37% sodium styrenesulfonate, as well as polyhexamethylene adipamide filaments (designated Samples 3, 4, 5 and 6, respectively), were prepared using known processes.

To demonstrate the reversible force and rate of equilibration, samples of each of the fibers were mounted in an Instron tester and treated with air having a relative humidity of 100% (at a temperature of 25° C.), and then air having 0% relative humidity at room temperature. The time required for the sample to reach 50% equilibration and the total force exerted by the sample as the fiber changed lengths in response to the change from 100% to 0% relative humidity (the samples being shorter at 0% relative humidity) are recorded in the following table:

TABLE 6

| Sample | Reversible Force (g.p.d.) | Reversible Length Change (Percent) | Time to 50% Equilibration (Sec.) |
| --- | --- | --- | --- |
| 1 | 0.60 | 4.2 | 12 |
| 2 | 0.15 | | 60 |
| 3 | 0.20 | 0.9 | 140 |
| 4 | 0.22 | 1.2 | 50 |
| 5 | 0.35-0.39 | 6.0 | 40 |
| 6 | 0.30 | 2.0 | 65 |

The reversible force of 0.6 gram per denier developed by the polybutadienesulfone fiber of the present invention upon treating alternately with 100% relative humidity air and 0% relative humidity air is particularly surprising. The force was achieved with complete reversibility although it is 50% of the breaking strength of cotton and approximately 30% to 40% of the fibers own breaking strength. For most fibers a force equal to 5% to 10% of their breaking strength results in irreversible fiber length changes. For the fiber of Sample 1, alternating with 0% and 100% relative humidity air every minute for sixteen hours caused no growth in fiber length nor any loss in force.

*Example XVIII*

A polybutadiene containing 98% cis-1,4-units, 1% trans-1,4-units, and 1% 1,2-vinyl units was dissolved in benzene to give a 12% solution, and 2% of tertiary butyl hydroperoxide was added, based on weight of solution, as catalyst (designated Solution A).

A second polybutadiene containing 40% cis-1,4-units, 50% trans-1,4-units, and 10% 1,2-vinyl units was dissolved in benzene to give a 10% solution, and 2% of tertiary butyl hydroperoxide was added, based on weight of solution, as catalyst (designated Solution B).

The two solutions were extruded simultaneously from a two-component spinning head, of the type described in Calhoun U.S. Patent 3,006,028, into a room temperature bath consisting of equal volumes of benzene and ethyl alcohol and saturated with sulfur dioxide, at a jet velocity of 44 linear yards per minute. The filaments were passed over a drive roll running at 23 yards per minute. The yarn was drawn 1.5× in a cold alcohol bath and then passed through a cold solution of 5% sodium bicarbonate before being taken up on a tube. The composite fiber exhibited the following crimp properties after a relaxation step in boiling water:

Crimps per extended inch (c.p.i.) _____ 7.4
Crimp index (CI)[1] _____ 19.6
Percent equilibrium crimp reversibility (ECR)[2] ___ 24.2
Squirm work (SW) _____ 34.7×10⁻⁵

[1] $CI = \frac{\text{extended fiber length} - \text{relaxed fiber length}}{\text{extended fiber length}} \times 100$

[2] $ECR = \frac{\text{total crimps (25° C. dry)} - \text{total crimps (95° C. wet)}}{\text{total crimps (25° C. dry)}} \times 100$

*Example XIX*

The solutions A and B of Example XVIII were spun under identical conditions with the exception that instead of drawing 1.5×, the yarn was drawn 2.15× in the cold alcohol bath. The crimp properties obtained on boiling water relaxed fibers were:

C.p.i. _____ 7.0
CI _____ 16.7
ECR (percent) _____ 27.3
SW (×10⁻⁵) _____ 23.4

*Example XX*

The solutions A and B of Example XVIII were spun under similar conditions of that Example except that spinneret jet velocity was reduced to 24 linear yards per minute. The yarn exhibited the following physical crimp properties when relaxed under conditions as noted in the following table:

TABLE 7 a = Boiling water.
b = Boiling 2% NaHCO₃ solution.
c = Boiling 2% Na₂CO₃.

|  | a | b | c |
|---|---|---|---|
| Denier/Filament | 5.5 | 6.0 | |
| C.p.i. | 7.4 | 10.5 | 15.1 |
| CI | 9.4 | 17.6 | 24.4 |
| ECR (%) | 5.5 | 11.8 | 45.4 |
| SW (× 10⁻⁵) | 15.1 | 34.0 | 41.7 |
| Dry tenacity (g.p.d.) | 0.89 | 0.84 | |
| Elongation (percent) | 19.9 | 21.3 | |
| Initial modulus | 25.3 | 20.0 | |

From the data in the table it will be observed that the number of crimps per inch, the crimp index, the equilibrium crimp reversibility, and squirm work can be varied by varying the conditions under which the filaments are boiled off.

The fibers were cut into 2½ inch staple and processed on a modified cotton system into spun yarn of 10s cotton count with 8.5 turns per inch of Z twist. A control yarn was spun from a similarly prepared homofiber from solution of Example XVIII. These yarns were knit on a circular Wildman machine in a simple Jersey stitch. Swatches of the knit fabrics were then finished under conditions similar to those noted previously in this example. The knit swatches were then tumbled-dried, and courses×wales and thickness determined as shown in the following table:

TABLE 8

| Fiber | Finishing | Cources×Wales Courses/in.× Wales/in. | Thickness, |
|---|---|---|---|
| A//B fiber | a | 306 | .037 |
| A homofiber | a | 306 | .027 |
| A//B fiber | b | 324 | .040 |
| A homofiber | b | 306 | .028 |
| A//B | c | 425 | .047 |
| A homofiber | c | 342 | .033 |

The ability to produce improved crimp properties and knit fabric bulking performance is clearly demonstrated by these data.

*Example XXI*

Fibers were spun under essentially the same conditions as Example XVIII except that each of the two solutions was prepared at 8% solids content. The fiber crimp properties obtained were essentially equivalent to those obtained in Example XX when relaxed under the same conditions as described in that example.

*Example XXII*

A polybutadiene containing 95% cis-1,4-units and 5% 1,2-addition units was dissolved in benzene to give a 10% solution, and 2% of tertiary butyl hydroperoxide was added, based on weight of solution, as catalyst. This solution (designated Solution C) along with Solution A of Example XVIII was cospun under essentially the same conditions as Example XVIII to yield a two-component fiber with the following crimp properties after boil-off relaxation:

Denier/filament _____ 7.1
C.p.i. _____ 3.6
CI _____ 2.4
ECR (percent) _____ 30.1
SW (×10⁻⁵) _____ 18.0
SCW (×10⁻⁵) _____ 17.0

*Example XXIII*

Solution B of Example XVIII and Solution C of Example XXII were cospun under essentially the same conditions as Example XVIII to yield a two-component fiber with the following crimp properties after a boil-off relaxation:

Denier/filament _____ 5.2
C.p.i. _____ 10.0
CI _____ 8.4
ECR (percent) _____ 51.0
SW (×10⁻⁵) _____ 10.5
SCW (×10⁻⁵) _____ 15.2

*Example XXIV*

Composite filaments are spun under the same conditions as Example XVIII. The filaments are treated at the boil in a 2% solution of Na₂CO₃ and then relaxed in plain boiling water. The crimp properties are as follows:

C.p.i. _____ 15.1
CI _____ 24.4
ECR (percent) _____ 51.5
SW (×10⁻⁵) _____ 74.1
SCW (×10⁻⁵) _____ 65.4

A crimp versus load test is also conducted to determine the ability of the fiber to form crimps under load. The test is conducted on boiled-off, relaxed fibers as follows: the filament is suspended by a clamp in a water bath maintained at about 95° C. and loaded with a weight (respectively 0.0, 0.0035, and 0.0125 gram). After equilibrium is attained (about 15 minutes), the sample is removed from the bath and allowed to equilibrate to ambient conditions (21° C., 65% RH) at which time the fiber forms a helical crimp. The distance between the weight and clamp is determined as L₁. The test weight is then replaced by a weight sufficient to mechanically remove the crimp (about 50 mg./denier) and the length between the weight and the clamp is again determined as L₂. The measure of crimp formed was determined as the percent length change occurring by formation of crimp going from hot-wet to dry.

$$\frac{L_2 - L_1}{L_2} \times 100\% = \text{Percent decrease in length due to crimping action at various loading}$$

The data obtained from the above filament were compared to that for a composite filament sample of acrylonitrile polymer of the type described in Example 1–B of Taylor U.S. Patent 3,038,237.

| | Percent Decrease in Length | | |
|---|---|---|---|
| | No Load | 0.0035 gram Load | 0.0125 gram Load |
| Composite acrylonitrile polymer filament | 18 | 8.7 | 0.0 |
| Composite polybutadiene-sulfone filament | 26 | 16.8 | 2.8 |

*Example XXV*

The 98% cis-1,4-polybutadiene described in Example XVIII was dissolved in trichloroethylene to give an 8.2% solution (viscosity=75 poises) and 2% of tertiary butyl hydroperoxide, based on weight of solution, was added as catalyst (designated Solution D).

The 40% cis-1,4-, 50% trans-1,4-, and 10% 1,2-vinyl polymer described in Example XVIII was dissolved in trichloroethylene to give an 11.8% solution (viscosity=70 poises) and 2% of tertiary butyl hydroperoxide, based on weight of solution, was added as catalyst (designated Solution E).

These two solution were spun as a two-component fiber under the conditions described in Example XVIII. Crimp and physical properties were determined on fibers relaxed under the following conditions:

TABLE 9 a = Boil-off in water.
b = Boil-off in water plus 5% NaOH, based on weight of fiber.
c = Boil-off in water plus 7.5% NaOH, based on weight of fiber.

| | a | b | c |
|---|---|---|---|
| Denier/Filament | 4.7 | 4.4 | 4.5 |
| Tenacity (dry), g./d. | 1.0 | 1.0 | 1.1 |
| Elongation (dry), percent | 15.7 | 14.1 | 16.8 |
| Modulus (dry), g./d. | 26.1 | 23.6 | 21.6 |
| C.p.i. | 7.3 | 8.9 | 12.9 |
| CI | 5.7 | 13.9 | 14.9 |
| ECR (percent) | 26.0 | 27.8 | 27.3 |
| SW ($\times 10^{-5}$) | 8.5 | 19.0 | 28.1 |
| SCW ($\times 10^{-5}$) | 9.7 | 11.0 | 32.2 |

*Example XXVI*

Solutions were prepared in a similar manner to Solutions D and E of Example XXV except that Solution D was prepared at 9.4% (viscosity=43 poises) and Solution E was prepared at 8.6% (viscosity=80 poises).

The two solutions were spun as a two-component fiber and physical and crimp properties determined on fibers relaxed under conditions a, b, and c of Example XXV.

| | a | b | c |
|---|---|---|---|
| Denier/Filament | 4.8 | 4.5 | 4.0 |
| Tenacity (dry), g./d. | 1.1 | 1.1 | 1.2 |
| Elongation (dry), percent | 16.1 | 16.4 | 16.7 |
| Modulus (dry), g./d. | 28.8 | 25.2 | 21.4 |
| C.p.i. | 5.8 | 9.6 | 14.5 |
| CI | 3.4 | 8.2 | 20.0 |
| ECR (percent) | 4.3 | 29.0 | 20.1 |
| SW ($\times 10^{-5}$) | 8.1 | 12.0 | 41.8 |
| SCW ($\times 10^{-5}$) | 6.6 | 9.3 | 41.8 |

*Example XXVII*

A two-component fiber was spun under the same conditions as described in Example XVIII except 0.8% $TiO_2$ (5–10-micron particle size) was added to Solution B, based on weight of polymer. A photomicrograph was taken taken at 400× magnification of a cross section of the fiber. An essentially round and hemispherically divided cross section was observed. Microscopic examination of the fiber after boil-off revealed that the polymer of Solution B lies on the inside of the helix in the crimped fiber.

*Example XXVIII*

An 8% solution was prepared of a polybutadiene (PBD) having 98% cis-1,4-polymer, 1% trans-1,4-polymer, 1% 1,2-polymer, using tetrahydrofuran (THF) as solvent and containing 2% of tertiary butyl hydroperoxide TBHP (on the weight of the solution). One half of this solution was spun into a coagulation bath consisting of THF/isopropyl alcohol/water in the ratio 74/18/8 and containing 36 gram sulfur dioxide per 100 ml. of bath. This will be referred to as yarn XXVIII–A.

The other half of the solution was spun into a coagulation bath of 100% isopropyl alcohol saturated with sulfur dioxide. This will be referred to as yarn XXVIII–B.

Yarns A and B were washed and drawn 2× in hot water (95 to 100° C.). They were then passed through a 5% bath of sodium bicarbonate and finally washed and dried. The filaments of the yarns were found to have the following properties:

| | Yarn A | Yarn B |
|---|---|---|
| Straight tenacity (g./d.) | 2.0 | 1.73 |
| Modulus (g./d.) | 55 | 60 |
| Elongation (percent) | 9 | 15 |
| Loop tenacity (g./d.) | 0.45 | 0.84 |
| Loop elongation (percent) | 1.0 | 2.4 |
| Work-to-break (gm. cm./den. cm.) | 0.002 | 0.014 |
| Flex life (bending cycles to break) | 700 | 2000 |
| Cross section shape | (¹) | (²) |
| Denier | 1.85 | 1.65 |
| Sulfur ³ | 25.5 | 25.3 |

¹ Round.
² Bean.
³ Grams per gram equivalent weight of polymerized butadiene.

The work-to-break and flex life were notably improved by using the THF as solvent and the isopropyl alcohol bath for spinning.

*Example XXIX*

This example demonstrates the advantage of spinning with a low tension on the freshly spun fiber.

A 7.5% solution of PBD (98% cis-1,4-) containing 2% tertiary butyl hydroperoxide in THF as solvent was spun under two conditions into a coagulation bath of THF/isopropyl alcohol (75/25) saturated with sulfur dioxide. Yarn XXIX–A was spun with a spin draw of 0.8 and yarn XXIX–B with a spin draw of 1.1. The yarns were further washed and drawn 2.1× as in Example XXVIII. The fiber properties of the two yarns were as follows:

| | Yarn A | Yarn B |
|---|---|---|
| Spin draw ratio (fraction of original length) | 0.8 | 1.1 |
| Straight tenacity (g./d.) | 1.62 | 2.0 |
| Modulus (g./d.) | 13 | 9 |
| Elongation (percent) | 46 | 55 |
| Loop tenacity (g./d.) | 1.2 | 0.45 |
| Loop elongation (percent) | 6 | 1 |
| Work-to-break (gm. cm./den. cm.) | 0.051 | 0.002 |
| Flex life (cycles to break) | 30,800 | 500 |

The low spin-draw fibers show a remarkable advantage in toughness even though they have lower straight tenacity.

*Example XXX*

A solution A is prepared from PBD containing 98% cis-1,4-polymer using THF as solvent. This solution contains 8% PBD and 2% TBHP.

A solution B is prepared from a PBD having 95% cis-1,4-polymer with the same solvent as A and likewise containing 8% PBD and 2% TBHP.

Solutions A and B are extruded simultaneously from a two-component spinning head of the type described in Calhoun U.S. Patent 3,006,028. The coagulation bath contains THF/isopropyl alcohol/water 74/20/6. The resulting two-component filaments are washed and drawn 2.0× in boiling water, then are passed through a hot 5% solution of sodium carbonate, washed and dried.

In the examples describing the preparation of composite filaments, it has been shown that the degree of crimping can be controlled by varying either the sulfur content differential between the two components or by varying the conditions during the alkaline bath treatment. In regard to the alkaline bath treatment, it has been found that under basic conditions those fibers containing a sulfur content near the maximum, i.e., approaching 32 grams of sulfur per gram equivalent weight of polymerized butadiene, exhibit a high degree of hydrolytic stability. As the sulfur content is decreased, i.e., approaching 27 grams of sulfur per gram equivalent weight of polymerized butadiene, the hydrolytic stability progressively decreases. Merely by varying the pH of an aqueous bath between a pH of about 11.5 to about 12.0, the degree of crimping can be influenced.

While for most uses composite filaments containing approximately equal amounts of two different polybutadienesulfones are preferred, the percentage of the components may be varied over a wide range, due to the high crimping forces which are developed by the fiber-forming polymers of this invention. In addition, for some purposes it may be desired to use more than two different polybutadienesulfones in the composite structure. While it is preferred that the two components be maintained in distinct and separate zones, e.g., side-by-side or sheath core structure, some intermingling of two components can be permitted without interfering with the crimping of the composite structures.

As illustrated in the foregoing examples describing homofibers, only filaments which contain at least about 27 grams of sulfur per gram equivalent weight of polymerized butadiene exhibit the excellent properties heretofore mentioned. In the polymers of this invention, the polymer chain is substantially free of residual unsaturation. As presently understood, the polymers are substantially free of pendant vinyl groups which could form cross-linking sites. Accordingly, the linear structure permits considerable drawability. The polymer chain may vary in length with the molecular weight being in the range from about 5000 to about 1,000,000.

As previously mentioned, the sulfur content of the filamentary products of this invention can be as high as 32 grams per gram equivalent weight of polymerized butadiene. In such a case, all of the repeating units of the polybutadiene-sulfone will be of the formula previously set forth herein. While the sulfur is generally present as sulfone, minor percentages of the sulfur may be present in acid form, e.g., sulfonic acid.

The properties of the filaments of this invention may be changed somewhat by utilizing blends of other diene polymers with polybutadiene. For example, the density of the filaments may be reduced without changing the grams of sulfur per gram equivalent weight of starting polybutadiene by the addition to the spinning solution of a substantially saturated hydrocarbon. A polymer which is satisfactory for blending with polybutadiene may be made by copolymerizing 3% of isoprene with isobutylene. The resulting interpolymer contains a small amount of unsaturation which permits reaction with the sulfur dioxide in the same manner as the polybutadiene. Small amounts of other conjugated diene hydrocarbons, e.g., isoprene and chloroprene, may be utilized, provided the sulfur content of the butadiene portion of the final product is maintained at at least about 27 grams per gram equivalent weight of polymerized butadiene.

Various additives may be included both in the polymer spinning solution as well as in the coagulating bath. For example, a flame retardant such as tris(dibromopropyl)-phosphate in amounts up to 10% may be included in the spinning solution. Various lubricants may be included in the coagulating bath or in a subsequent bath. Pigment dispersions in amounts up to 5% by weight (based on the weight of the spinning solution) to yield pigment weights in the final product up to 10% may be added to the spinning solution or, alternatively, applied to the surface of the filaments in a bath subsequent to the final wash bath.

While the primary utility of the products of the present invention resides in textile applications, it is possible by following the teachings of the present invention to prepare other shaped articles by extrusion of the selected butadiene polymer solution into a sulfur dioxide-containing reaction medium. In addition, insoluble coatings of the polybutadienesulfones may be formed on various surfaces.

The filaments of the present invention have many desirable properties which make them particularly useful for apparel fabrics. The second order transition temperature of the filaments is well above 100° C. which accounts for their relatively high hot-wet modulus, e.g., about 20–30 grams per denier at 90° C.

Accordingly, the filaments are not adversely affected by hot-wet treatments such as scouring and dyeing. The filaments also have a high resistance to glazing, i.e., the tendency of the filaments or fabric to shine or reflect light after being ironed or pressed which is an inherent weakness in some synthetic as well as natural filaments.

The filaments of this invention dye readily with uniform coloration with either dispersed or basic dyes. The basic dyes can be applied at temperatures well below the boiling point of the dye liquor and yield bright colors that are fast to light and washing. Deep shades are readily obtained with dispersed dyes.

As many widely different embodiments of this invention may be made without departing from the spirit and scope thereof, it is to be understood that this invention is not to be limited to the specific embodiments thereof except as defined in the appended claims.

I claim:
1. A polybutadienesulfone consisting essentially of a plurality of repeating units having the structural formula:

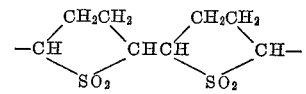

wherein the combined sulfur content is at least about 27 to about 32 grams per gram equivalent weight of polymerized butadiene and wherein the said polymerized butadiene consists of at least 85%, 1,4-butadiene units, the remainder of said units being 1,2-butadiene units.

2. The polymer of claim 1 in the form of a filament.
3. A composite textile filament comprised of at least two different polybutadienesulfone components wherein said components are eccentrically disposed toward each other in distinct zones along the length of said filament, each of said polybutadienesulfones having a plurality of cyclic 2,5-tetramethylene sulfone repeating units and a combined sulfur content of at least about 27 to about 32 grams of sulfur per gram equivalent weight of polymerized butadiene consisting of, said polymerized butadiene at least 85% 1,4-butadiene units, said components having a differential content of sulfonylated 1,4-butadiene units of about 1 to 10%, said composite filament exhibiting reversible crimp when treated in a hot moist atmosphere and dried.

References Cited
UNITED STATES PATENTS
2,469,847    5/1949    Rumscheidt et al. _____ 18—54

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,329,660
July 4, 1967

Leonard S. Pitts

It is hereby certified that error appears in the above numbered patent requiring correction and that the said Letters Patent should read as corrected below.

Column 3, line 54, for "mount" read -- amount --; column 8, TABLE 1, seventh column, line 5 thereof, for "29.7" read -- 29.1 --; same TABLE 1, seventh column, line 6 thereof, for "30.1" read -- 30.7 --; column 13, TABLE 8, heading to the fourth column under "Thickness," insert -- Inches --; column 18, line 58, strike out "consisting of" and insert the same after "butadiene", second occurrence, same line 58, same column 18.

Signed and sealed this 18th day of June 1968.

(SEAL)
Attest:

Edward M. Fletcher, Jr.
Attesting Officer

EDWARD J. BRENNER
Commissioner of Patents